Feb. 27, 1934.    J. O. ALMEN    1,948,482
CAR SUSPENSION
Filed Sept. 26, 1932
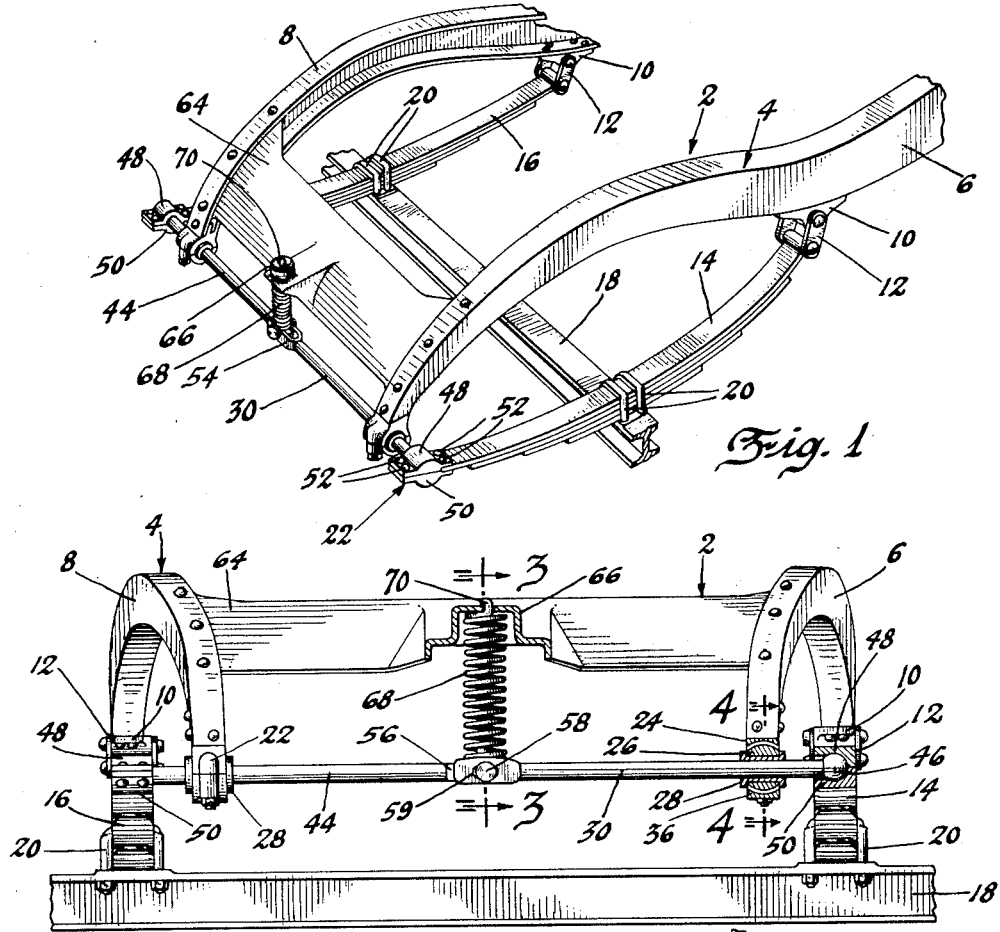
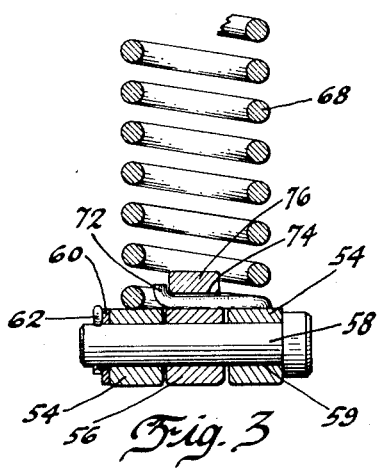
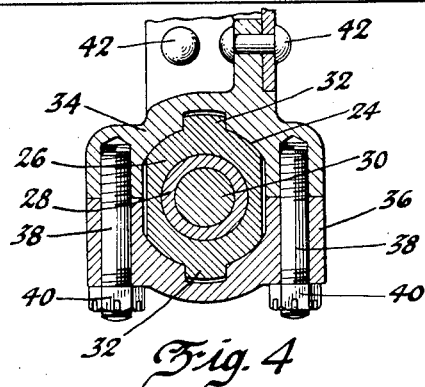
Inventor
John O. Almen
By Blackmore, Spencer & Flint
Attorneys Patented Feb. 27, 1934

1,948,482

UNITED STATES PATENT OFFICE 1,948,482

CAR SUSPENSION

John Otto Almen, Royal Oak, Mich., assignor to General Motors Research Corporation, Detroit, Mich., a corporation of Delaware Application September 26, 1932
Serial No. 634,867

7 Claims. (Cl. 267—11)

This invention relates to automotive vehicles and has particular reference to an improved spring suspension therefor.

The construction of the invention involves the use of a supplemental spring or a plurality of supplemental springs so associated with the longitudinal loop springs that the supplemental spring or springs work in unison to prevent undue swaying of the vehicle. This is particularly useful in taking care of light loads. The usual heavy longitudinal springs take care of heavy loads and are left free to work independently of each other in the usual way.

In the preferred form of the invention, the device comprises two bars or rods which are pivoted intermediate their ends to the ends of the usual chassis frame side bars. The rods extend beyond the side frame and at their ends have a ball joint connecting with the spring shackle. The rods extend toward each other and are united by a pin and slot connection. Over the connection between the rods a tension spring is placed which is held between the connection and a stationary part of the vehicle.

On the drawing:

Figure 1 shows a perspective view of the end of a vehicle chassis showing the invention applied.

Figure 2 is a view in elevation looking toward the end of the vehicle with parts shown in section for purposes of clearer illustration.

Figures 3 and 4 are sections on the line 3—3 and 4—4 of Figure 2.

Referring to the drawing, the numeral 2 indicates a vehicle having a chassis frame 4 comprising the side bars 6 and 8. The side bars have the usual brackets 10 secured thereto and spring shackles 12 secured to the brackets. Pivoted to each shackle are the leaf springs 14 and 16 secured intermediate their ends to the axle 18 by means of U-bolts 20. The parts so far described are conventional and per se form no part of the invention.

At the chassis end the side bars 6 and 8 have a special construction indicated as a whole at 22. The detail of this special construction is shown at the right of Figure 2 and in Figure 4 and comprises the spherical bearing at 24 in which the ball 26 is mounted. The ball 26 has a bearing sleeve 28 therein in which the rod or bar 30 is slidably mounted. The ball 26 is confined in its movement by tongue and groove connections 32 shown in Figure 4 so that it may move in a plane substantially at right angles to the chassis only. The construction 22 includes the upper member 34 and the cap 36 held to the top member by means of the bolts 38 and nuts 40. The top member 34 is secured to the chassis by means of the rivets 42. The left side of the vehicle (Figure 2) has the same construction and a bar or rod 44 similar to the bar or rod 30.

The outer ends of the bars 30 and 44 are formed into ball shape as indicated at 46. The balls are received between the upper bearing members 48 and lower members 50 secured together and to the upper leaf of the springs 14 or 16 by means of the rivets 52.

The bars 30 and 44 extend toward each other and have their ends flattened, the bar 30 being formed into a fork the tines of which are indicated at 54. The bar 44 has a flattened end 56 which is received between the tines 54. Either the tines 54 or the end 56 is slotted and a bolt 58 is received in the slot 59 and in an aperture in the other member. A washer 60 and a cotter pin 62 hold the bolt in place. The connection between the ends 44 and 30 will allow a pivotal movement and a limited movement of the ends toward and away from each other.

Between the ends of the chassis bar, there is secured a plate or reinforcing member 64 having a rounded portion 66 pressed therefrom to form a seat or cup in which one end of a coil spring 68 is received and secured in any suitable way. The opposite end is seated over the joint at the pin 58 as shown in Figures 2 and 3 and is secured in any suitable way.

In the arrangement described, it is designed to have the main springs 14 and 16 and the soft spring 68 acting in series to give easy riding when both main springs are acting in unison but to prevent car sway by mutual balancing of the forces to nullify the soft spring action when the conditions of swaying occur.

On the drawing the main springs 14 and 16 are connected through ball joints 46 to the cross shafts 30 and 44 pivoting respectively in bearings 24 to permit angular deflection in a transverse plane. The two shafts are connected at the center by the blade and fork arrangement and held in place by pin 58 in a slot 59. The center of the rods is cushioned on spring 68. For parallel motion of the main springs, the reactions on the rods 30 and 44 act in the same direction bringing spring 68 into play. For opposite directions of spring motion, the reactions of rods 30 and 44 are opposed which gives in effect a rigid cross structure and eliminates the functioning of spring 68. The fork and tongue construction prevents fore and aft angular motion of rods 30 and 44.

Because the spring 68 operates in tension, it is necessary to secure its ends. The upper spring end is hooked into the reinforcing member 64, as shown at 70, while the lower spring end 72 is passed through an opening 74 in a stud 76 integral with the end 56 of the rod 30.

I claim:

1. In a spring suspension for vehicles having a chassis frame with a spring at each side thereof, means connecting the springs at one of their ends to the chassis frame, a rod connected to the other end of one spring, a second rod connected to the other end of the second spring, means movably connecting said rods to the vehicle, means movably interconnecting said rods, and resilient means at said connection to resist movement of the rods.

2. In a spring suspension for vehicles having a chassis frame with a spring at each side thereof, means connecting the springs at one of their ends to the chassis frame, a rod connected to the other end of one spring, a second rod connected to the other end of the second spring, means movably connecting said rods to the vehicle, means movably interconnecting said rods at their ends substantially at the centerline of the vehicle, and a resilient means at said interconnection to resist movement of the rods.

3. In a spring suspension for vehicles having a chassis frame with a spring at each side thereof, means connecting the springs at one of their ends to the chassis frame, a rod connected to the other end of one spring, a second rod connected to the other end of the second spring, means movably connecting said rods to the vehicle, means connecting said rods to allow a relative limited movement toward and away from each other, and resilient means at said interconnection to resist angular movement of the rods.

4. In a spring suspension for vehicles having a chassis frame with a spring at each side thereof, means connecting the springs at one of their ends to the chassis frame, a rod connected to the other end of one spring, a second rod connected to the other end of the second spring, means movably connecting said rods to the vehicle, means movably interconnecting said rods at their middle, said interconnection allowing a relative limited movement toward and away from each other, and resilient means at said interconnection to resist angular movement of the rods.

5. In a spring suspension for vehicles having a chassis frame with a spring at each side of the vehicle, means connecting the springs at one of their ends to the chassis frame, a rod connected to the other end of one spring, a second rod connected to the other end of the second spring, means pivotally connecting said rods to the vehicle, means for movably interconnecting said rods, and resilient means mounted between the interconnection and a stationary part of the vehicle to resist movement of the rods.

6. In a spring suspension for vehicles having a chassis with a spring at each side thereof, means connecting the springs at one of their ends to the chassis, an axle on which said springs are mounted intermediate their ends, a rod having a ball and socket connection to the other end of one spring, a second rod having a ball and socket connection with the other end of the second spring, means slidably connecting said rods to the chassis frame, means movably interconnecting said rods, and resilient means secured to the rods at the interconnection to resist movement of the rods.

7. In a spring suspension for vehicles having a chassis with a spring at each side thereof, means connecting the springs at one of their ends to the chassis, an axle on which said springs are mounted intermediate their ends, a rod having a ball and socket connection to the other end of one spring, a second rod having a ball and socket connection with the other end of the second spring, means slidably and turnably connecting said rods to the chassis frame, means movably interconnecting said rods, and resilient means secured to the rods at the interconnection to resist movement of the rods.

JOHN OTTO ALMEN.